Sept. 23, 1941.  G. HÖRGÅRD  2,256,901
PRODUCTION OF FERROALLOYS
Filed Aug. 22, 1939
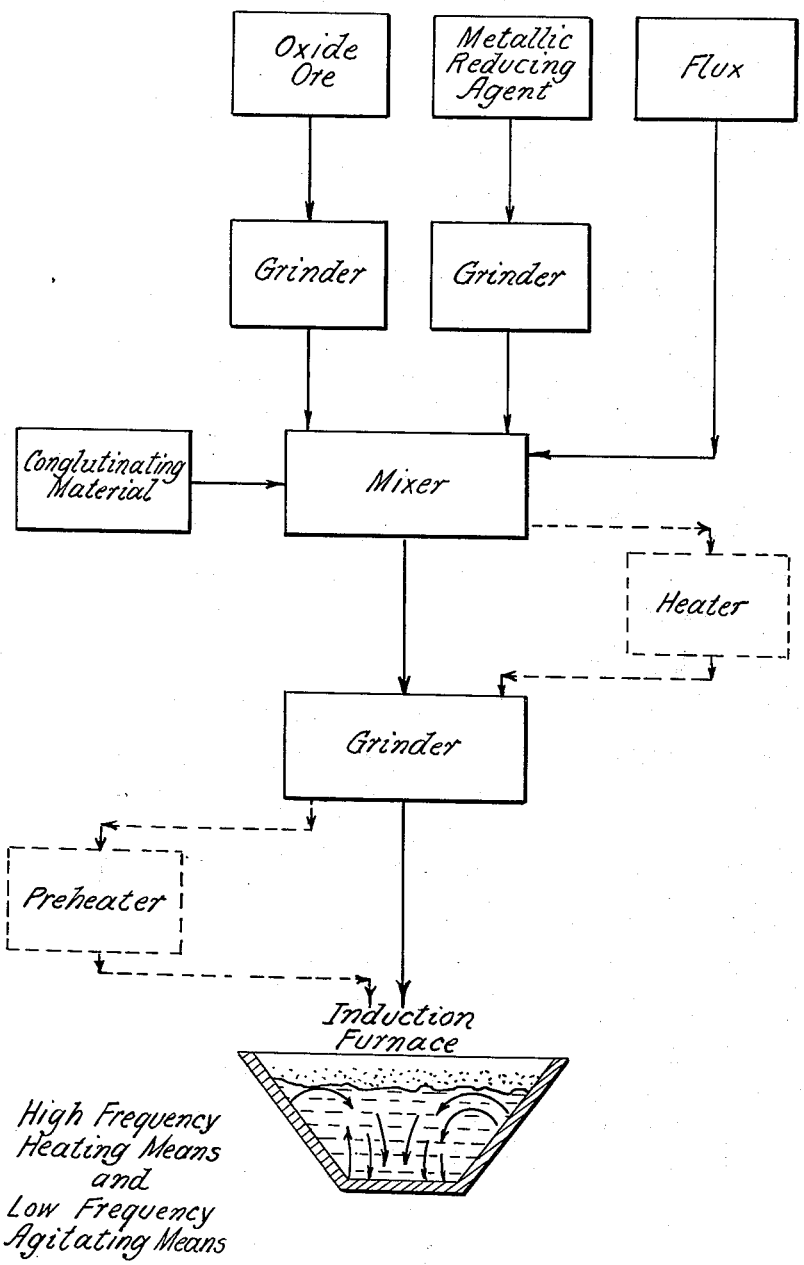
INVENTOR
Gunnar Hörgård
BY
Pennie, Davis, Marvin & Edmonds
ATTORNEYS Patented Sept. 23, 1941

2,256,901

UNITED STATES PATENT OFFICE 2,256,901

PRODUCTION OF FERROALLOYS

Gunnar Hörgård, Oslo, Norway, assignor to William Bell Arness, Ambridge, Pa., and Oliver Smalley, Pittsburgh, Pa.

Application August 22, 1939, Serial No. 291,430
In Norway August 22, 1938

10 Claims. (Cl. 75—11)

This invention relates to the production of ferro-alloys of low carbon content, and has for its object the provision of an improved method of producing such products. The invention is more particularly concerned with the production of ferro-alloys from ores with metallic reducing agents such as silicon, ferro-silicon etc. in an electric furnace, and in this connection the invention contemplates the production of ferro-alloys, rustless or stainless steel and similar products direct from ores in an electric furnace of the induction type.

As the result of an intensive study and investigation of the subject, supplemented by exhaustive experiments and demonstrations on a technically adequate scale, I have discovered that ferro-alloys can be produced direct from ores in an induction furnace in a manner both technically and economically satisfactory. I have, for example, found that it is important that the charge be vigorously stirred or agitated during reduction of the ore, and that a substantial volume of residual metal should always remain in the furnace. The present invention, based on these and other discoveries made in the course of my investigation, will be best understood from the following description in which its characteristic and novel features are particularly pointed out. The accompanying drawing illustrates diagrammatically, by means of a flow sheet, a method embodying the invention. The parts shown in broken lines illustrated alternative variations.

In carrying out the invention, the oxides of the metals to be reduced, such as chromium, molybdenum, manganese, tungsten, titanium, vanadium, niobium etc., are reduced by means of silicon in the form of ferro-silicon, calcium silicide, silicon alloys of the respective metals and the like, or by means of other metallic reducing agents such as calcium, aluminum, magnesium, sodium and the like. While silicon is not strictly a metal, it is similar to a metal as a reducing agent and is understood to be included in the materials covered by the definition "metallic reducing agent." The silica and/or other acidic substances formed by the reducing reaction is slagged by the addition of basic substances such as lime, magnesia etc. The use of magnesia (magnesium oxide) as a flux is of special advantage, since it improves the durability of the crucible lining. The operation is conducted in an induction furnace equipped with high frequency current for heating and low frequency current for stirring or agitating the molten bath. Each of the two kinds of current (i. e. high and low frequency) is capable of independent regulation and control. A suitable induction furnace for the purpose is of the type described in Norwegian patent No. 56,108.

In practicing the present invention, for example in the furnace of the type described in Norwegian patent 56,108, the low frequency current may be applied as desired, and can be, and usually is, applied when the crucible is only partly filled, as for instance from one to two-thirds or more.

In order that the operation may be carried out with good results, it is advantageous that it be carried on uninterruptedly. In accordance with the invention, this is accomplished by drawing off only a minor portion of the molten metal contained in the furnace, so that there will always remain in the furnace a quantity of metal amounting to from at least one-third up to two thirds or more of the total volume of metal plus the charge of ore and the slag in the furnace.

When smelting for the first time in a furnace with a new lining, there is first introduced into the crucible such a quantity of the mixture (metals) to be alloyed that the crucible is filled up to about two-thirds or more of its capacity. After the mixture is melted and well mixed, the charge of finely crushed and well mixed ore, metallic reducing agent (e. g. ferro-silicon) and flux (e. g. lime) is added to the molten metal bath. The entire charge may be introduced into the bath at one time, or the charge may be subdivided and added at intervals to the bath until all of the charge has been introduced. As the charge is added, the low frequency current is applied and the charge will be thereby whirled around in and thoroughly mixed with the molten metal. In the meantime, the high frequency current, which has been continuously applied, develops within the molten metal and the charge admixed therewith the necessary heat to bring about the reduction of the metal oxide or oxides of the charge and the formation of a fluid slag. When producing rustproof or stainless steel, the operation is initiated with a bath of molten iron, the alloying metal or metals being included in the charge in the form of oxides (ores) and reduced as hereinabove described. At suitable intervals, as the formation of slag lowers the absorption of energy and the consequent development of heat or as the slag fills the crucible, the slag is drawn off, the low frequency agitating current being in the meantime cut off. Fresh charge is then introduced into the crucible and the smelting operation resumed, From time to time a minor part of the molten metal in the crucible is tapped off, say 200 to 400 kg. in the case of a 1000 kg. furnace. After tapping, heating up and mixing of the molten metal and charge in the crucible is resumed and continued until time to again pour or draw off slag or tap metal.

By working uninterruptedly in the manner hereinabove described, subjection of the furnace lining to wide variations of temperature is avoided. It is not necessary to apply the low frequency agitating current all of the time. In fact, in order to reduce the erosion of the lining, it must be possible to operate at times without agitating the contents of the crucible, since the transmission of heat to the charge resting on the bath of molten metal may be very considerable. Any surplus of heat in the bath will be utilized in the subsequent agitation of the contents of the crucible.

Operating in the manner hereinbefore described ferro-alloys of the desired low carbon content, such as ferro-chromium, ferro-molybdenum, ferro-manganese, ferro-titanium, ferro-tungsten, ferro-vanadium, ferro-niobium as well as stainless steel and the like, can be economically produced in an electric induction furnace, although the reactions taking place result in the formation of a quantity (volume) of slag more times as great as the quantity of reduced metal. In the production of ferro-chromium, the quantity (volume) of slag formed is about nine times that of the reduced metal. By proper adjustment of the quantity of chromium ore included in the charge, it is possible to attain the direct production of ferro-alloys with the content of chromium usual for stainless steel. Also it is possible in the same reducing operation to simultaneously reduce the oxides of two or more metals and incorporate the reduced metals in the molten metal bath, as for example in the production of special alloys containing, for instance, chromium, nickel etc.

In the preferred practice of the invention, the crucible of the induction furnace has an upwardly increasing cross sectional area. In other words the crucible expands upwardly in the manner of a cone, the conical angle being preferably about 60° or more. As a result of this configuration of the crucible, the large quantity of slag formed during the operation will, as the reducing action progresses, more easily obtain room in the rapidly increasing space in the upper part of the crucible. Such a configuration of the crucible also results in increasing the surface area of the molten metal bath, whereby the contact surface between the bath and the charge is increased, and the admixture of the charge of ore, metallic reducing agent and flux with the bath is more easily effected.

The conical configuration of the crucible also involves the advantage that tapping off of a larger or smaller quantity of the contents will occasion only a comparatively slight decrease in the level of the molten metal bath. This leads to material advantages as regards the electrical circuits, since it avoids having to divide the coils into several circuits, as is necessary in the case of a cylindrically shaped crucible.

It has been found that the basic lining of the crucible is subjected to severe erosion by the silica formed during the reaction. This silica is conveyed to the walls of the furnace by the movement of the bath. Large additions of basic materials, such as lime and magnesia, will reduce the tendency to erosion of the lining. Nevertheless, severe erosion of the lining still takes place, even though the charge includes a quantity of lime or magnesia more than sufficient to combine with all of the silica formed.

I have discovered that such excessive erosion of the basic lining of the crucible can be avoided by special preliminary treatment and conditioning of the charge. If we assume that the charge (consisting of a mixture of ore, ferro-silicon and lime) is dumped in a heap upon the molten metal bath in the crucible of an induction furnace and that the low frequency agitating current is then applied, the specifically heavier ore and also the ferro-silicon, which latter has a chemical affinity for the metal bath owing to the formation of silicide, will first be stirred into the bath, while the lighter lime has a tendency to remain floating on the surface. The ore and the ferro-silicon will then react upon each other in the molten metal bath, and the silica formed may then at once attack the lining.

In accordance with this feature of my invention, I so prepare and condition the charge that the necessary lime is present in sufficient quantity precisely at the place where and at the time when the silica is being formed. This is brought about by crushing or grinding the basic substance, such as lime or magnesia, with the metallic reducing agent, such as ferro-silicon etc., and/or with the ore or ores to be reduced in such a manner that the basic substance is pressed into the particles of or conglutinated with the metallic reducing agent and/or ore or ores.

Whether the basic substance (e. g. lime) is conglutinated with the metallic reducing agent or the ore or both, whenever and wherever the reducing agent reacts with the ore and silica is formed there will always be present in the immediate neighborhood a sufficient quantity of the basic substance to combine with the silica to form a silicate (e. g. calcium silicate), whereby the tendency of the silica to erode the lining is very substantially reduced.

The congultination of the charge components is preferably effected in such a manner that all three reacting substances, the ore, reducing agent and basic substance, are subjected to a process of grinding or crushing so that all three components are combined together into individual particles which may be easily stirred into the molten metal bath. By such conglutination of the three components of the charge, there is attained the great advantage that, in the first place, the reducing agent will at once react with the ore and reduce it, and in the second place, the silica formed will then immediately combine with the lime (or other basic substance) to form calcium silicate (or other silicate).

The simultaneous crushing or grinding of the three components of the charge may be carried out in various ways and in various types of apparatus. For example, the components may first be separately crushed or ground, subsequently mixed in the desired proportions and then subjected to renewed grinding preferably in an edge-runner, or passed through rolls so that the different components are thoroughly pressed together.

It has further been found advantageous, in order to facilitate the conglutination of the three components of the charge, to expose the mixed components to a suitable heat treatment for binding the particles thereof together before they are simultaneously crushed. This preliminary heat treatment may be conducted at a temperature of from 200 to 600° C. Sintering agents may be admixed with the charge in order to facilitate the conglutination of the particles.

The conglutination of the components of the charge may be further facilitated by the addition of small quantities of substances that will occasion a direct conglutination of the particles, such, for example, as small quantities of waterglass or organic cements which will not give off carbon to enter the metal bath.

Owing to the high cost of the induction furnace, inductive heating is relatively expensive especially when a large amount of heat is required. In order to reduce the electric power load of the furnace and thereby to a large extent its cost, the invention contemplates reducing the electric power requirement of the induction furnace by providing a supplemental or auxiliary source of heat. This may be accomplished by combining the induction furnace with a heating plant in which heat can be developed at a materially lower cost than in the induction furnace. The heating plant may have electrical resistance heating, fuel combustion or any other means of producing heat at low cost. The heating plant may advantageously be in the nature of a preheater for the charge, in which case the charge may be heated while being mixed and conglutinated and in a highly heated state may be charged continuously, or intermittently, into the induction furnace. Supplemental or auxiliary heat, for reducing the electric power requirement of the induction furnace, may also be provided, alone or in conjunction with the above described heating plant, by including in the charge suitable amounts of substances which lead to further exothermic reactions, as in the alumino- or silico-thermic processes.

The advantages of preheating the charge with respect to the consumption of power in the induction furnace will be seen from the following example:

*Production of ferro-chromium*

Calculated for 1 ton of ferro-chromium

|  | kwh. |
|---|---|
| (a) Heat balance without preheating. | |
| Heating up to 1600° C. and melting of 1000 kg. of metal (spec. heat 0.20) | 415 |
| Heating up to 1600° C. and melting of 2700 kg. of slag, including heat of formation | 1020 |
|  | 1435 |
| Less exothermic heat | 495 |
| Total heat (power) requirement in induction furnace | 940 |

|  | kwh. |
|---|---|
| (b) Heat balance with preheating up to 900° C. | |
| Heating up to 1600° C. and melting of 1000 kg. of metal and 2700 kg. of slag | 1435 |
| Heating up to 900° C. of 1000 kg. of metal 185 kwh. (sp. heat 0.18) | |
| Heating up to 900° C. of 2700 kg. of slag 615 kwh. (sp. heat 0.22) | 800 |
|  | 635 |
| Less exothermic heat | 495 |
| Total heat (power) requirement in induction furnace | 140 |

The following examples illustrate various practices of the invention conducted in a 30-kg. induction furnace:

(1) 6.3 kg. Fe-Cr (70% Cr) was melted. To the molten bath was added in small portions 16 kg. of a finely pulverized mixture consisting of

| | Per cent |
|---|---|
| Cr-ore | 65 |
| CaSi$_2$ | 18 |
| CaO | 17 |

Time elapsing from melting to tapping was 30 minutes. The slag, which floated very easily, was removed from time to time. The metal obtained weighed 8.6 kg. and contained

| | Per cent |
|---|---|
| Cr | 64.5 |
| Si | 2.0 |

The analysis of the slag was

| | Per cent |
|---|---|
| SiO$_2$ | 27.5 |
| CaO | 31.0 |
| MgO | 14.5 |
| Cr | 4.1 |

(2) 3.89 kg. Fe-Cr (64.5% Cr) was melted down and to the molten bath there was added 15 kg. of a finely pulverized mixture consisting of

| | Per cent |
|---|---|
| Cr-ore | 57.3 |
| Fe-Cr (90%) | 11.7 |
| CaO | 31.0 |

There was obtained 6.01 kg. of metal containing

| | Per cent |
|---|---|
| Cr | 55.4 |
| Si | 2.99 |

The Cr-content in the slag was

| | Per cent |
|---|---|
| Cr | 2.3 |

(3) 5.0 kg. of Fe-Mn and 2.0 kg. of steel was melted down. To the melted mixture was added 15 kg. of a finely pulverized mixture consisting of

| | Per cent |
|---|---|
| Mn-ore | 56.0 |
| Fe-Si | 11.4 |
| CaO | 32.6 |

The analysis of the metal obtained was as follows:

| | Per cent |
|---|---|
| Mn | 61.4 |
| Si | 4.93 |

The slag contained

| | Per cent |
|---|---|
| Mn | 21.0 |

(4) 5.0 kg. of ferro-molybdenum was melted down. To the melted metal was added 15 kg. of a finely pulverized mixture consisting of

| | Per cent |
|---|---|
| MoO$_3$ | 40 |
| Si | 20 |
| Fe-Si (45%) | 4 |
| Burnt lime | 36 |

The metallic product obtained contained

| | Per cent |
|---|---|
| Mo | 45.1 |
| Si | 3.56 |

The slag contained

| | Per cent |
|---|---|
| Mo | 1.0 |
| SiO$_2$ | 33.9 |
| MgO | 30.8 |

It is to be understood that the invention is not to be limited by the foregoing examples which have been given solely for purposes of illustration. Ferro-tungsten, ferro-titanium, ferro-vanadium, ferro-niobium etc. may be produced in accordance with the principles of the invention in procedures similar to those illustrated in the examples.

I claim:

1. The method of producing low carbon ferro-alloys, in which an alloying metal of the kind forming a tenacious carbide is derived from a difficultly reducible oxide thereof, in an electric induction furnace equipped with high frequency heating means and low frequency agitating means which comprises charging into a relatively large bath of molten metal in the furnace a finely divided charge containing said metallic oxide, a metallic reducing agent and flux if necessary, vigorously stirring the contents of the furnace during the reduction of the metallic oxide by application of said low frequency agitating means, tapping molten metal from the furnace in such amount that a volume of molten metal is retained in the furnace of at least one-third the volume of the entire contents of the furnace, and drawing off slag from the furnace as required.

2. The method of producing low carbon ferro-alloys, in which an alloying metal of the kind forming a tenacious carbide is derived from a difficultly reducible oxide thereof, in an electric induction furnace equipped with high frequency heating means and low frequency agitating means which comprises charging a finely divided conglutinated mixture of said metallic oxide, a metallic reducing agent and flux if necessary into a residual bath of molten metal in the furnace, thoroughly incorporating the conglutinated particles of the mixture throughout the bath by application of said low frequency agitating means, and tapping molten metal and withdrawing slag from the furnace as required.

3. The method of producing low carbon ferro-alloys, in which an alloying metal of the kind forming a tenacious carbide is derived from a difficultly reducible oxide thereof, in an electric induction furnace equipped with high frequency heating means and low frequency agitating means which comprises preheating with a source of heat independent of the induction furnace a finely divided mixture containing said metallic oxide, a metallic reducing agent and flux if necessary, charging the preheated mixture into a relatively large bath of molten metal in the furnace, vigorously stirring the contents of the furnace during the reduction of the metallic oxide by application of said low frequency agitating means, tapping molten metal from the furnace in such amount that a volume of molten metal is retained in the furnace of at least one-third the volume of the entire contents of the furnace, and drawing off slag from the furnace as required.

4. The method of producing low carbon ferro-alloys, in which an alloying metal of the kind forming a tenacious carbide is derived from a difficultly reducible oxide thereof, in an electric induction furnace having a crucible of upwardly expanding configuration and equipped with high frequency heating means and low frequency agitating means which comprises smelting a finely divided mixture containing said metallic oxide, a metallic reducing agent and flux if necessary in a residual bath of molten metal in the crucible of the furnace, and vigorously stirring the bath during smelting by the application of said low frequency agitating means.

5. The method of producing low carbon ferro-alloys, in which an alloying metal of the kind forming a tenacious carbide is derived from a difficultly reducible oxide thereof, in a continuously operated electric induction furnace equipped with high frequency heating means and low frequency agitating means which comprises charging from time to time a finely divided charge containing said metallic oxide, a metallic reducing agent and flux if necessary into a relatively large bath of molten metal in the furnace, vigorously stirring the bath during smelting by the application of said low frequency agitating means, tapping molten metal from the furnace from time to time in such amount that a volume of molten metal is retained in the furnace of at least one-third the volume of the entire contents of the furnace, and drawing off slag from the furnace from time to time.

6. The method of producing low carbon ferro-alloys, in which an alloying metal of the kind forming a tenacious carbide is derived from a difficultly reducible oxide thereof, in a continuously operated electric induction furnace having a crucible of upwardly expanding conical configuration and equipped with high frequency heating means and low frequency agitating means which comprises charging from time to time a finely divided conglutinated mixture of said metallic oxide, a metallic reducing agent and flux if necessary into a relatively large bath of molten metal in the crucible of the furnace, thoroughly incorporating the conglutinated particles of the mixture throughout the bath by application of said low frequency agitating means, tapping molten metal from the furnace from time to time in such amount that a volume of molten metal is retained in the furnace of at least one-third the volume of the entire contents of the furnace, and drawing off slag from the furnace from time to time.

7. The method of producing low carbon ferro-alloys, in which an alloying metal of the kind forming a tenacious carbide is derived from a difficultly reducible oxide thereof, in an electric induction furnace having a crucible of upwardly expanding conical configuration and equipped with high frequency heating means and low frequency agitating means which comprises preheating with a source of heat independent of the induction furnace a finely divided mixture containing said metallic oxide, a metallic reducing agent and flux if necessary, charging the preheated mixture into a relatively large bath of molten metal in the crucible of the furnace, vigorously stirring the contents of the furnace during the reduction of the metallic oxide by application of said low frequency agitating means, tapping molten metal from the furnace in such amount that a volume of molten metal is retained in the furnace of at least one-third the volume of the entire contents of the furnace, and drawing off slag from the furnace as required.

8. The method of producing a low carbon metal product, in which a metal of the kind forming a tenacious carbide is derived from a difficultly reducible oxide thereof, which comprises forming a charge in the form of an intimate mixture of materials in a pulverulent state including a metallic reducing agent, at least one oxide of the metal to be reduced and a flux for the oxidized reducing agent, preheating the mixture, charging the preheated mixture into a furnace containing a bath of molten metal and heating it to the reducing temperature, and while reducing the metal oxide inducing a vigorous circulation of the molten metal and the mixture by means of an electric current induced therein.

9. In a method of producing a low carbon metal product, in which a metal of the kind forming a tenacious carbide is derived from a difficultly reducible oxide thereof, the improvement which comprises introducing on to a bath of molten metal in a furnace provided with heating means said charge including a metal oxide, a metallic reducing agent capable of reducing the metal oxide and a flux for the oxide of the reducing agent, said charge having been formed by heating a mixture of the three components to bind the particles together and then crushing them, controllably supplying heat to the bath as required to heat the charge to its reducing temperature, and while the reduction of the metal oxide is taking place inducing such a violent agitation in the bath by means of an electric current induced therein that the metal of the bath and the constituents of the charge are intermixed.

10. In the method of claim 9 which comprises the incorporation in said charge of a small quantity of a material which serves to cement or sinter the particles together.

GUNNAR HÖRGÅRD.